US009054559B2

(12) United States Patent
Marks De Chabris

(10) Patent No.: US 9,054,559 B2
(45) Date of Patent: Jun. 9, 2015

(54) METHOD AND SYSTEM FOR DISTRIBUTING ENERGY

(76) Inventor: Andrew Marks De Chabris, Toronto (CA)

( * ) Notice: Subject to any disclaimer, the term of this patent is extended or adjusted under 35 U.S.C. 154(b) by 0 days.

(21) Appl. No.: 13/418,096

(22) Filed: Mar. 12, 2012

(65) Prior Publication Data

US 2012/0217805 A1     Aug. 30, 2012

Related U.S. Application Data

(63) Continuation of application No. 12/274,878, filed on Nov. 20, 2008, now Pat. No. 8,138,629.

(30) Foreign Application Priority Data

Nov. 21, 2007  (CA) ..................................... 2611424

(51) Int. Cl.
   *H02J 3/38*       (2006.01)
   *H02J 15/00*      (2006.01)
(52) U.S. Cl.
   CPC ............... *H02J 15/00* (2013.01); *H02J 15/006* (2013.01); *Y02E 60/15* (2013.01)
(58) Field of Classification Search
   USPC .......................................................... 307/44
   See application file for complete search history.

(56) References Cited

U.S. PATENT DOCUMENTS

| 3,682,704 A | 8/1972 | Keefer |
| 5,439,575 A | 8/1995 | Thornton et al. |
| 5,448,889 A | 9/1995 | Bronicki |
| 5,610,802 A | 3/1997 | Eidler et al. |
| 5,798,633 A | 8/1998 | Larsen et al. |
| 6,026,349 A | 2/2000 | Heneman |
| 6,475,661 B1 | 11/2002 | Pellegri et al. |
| 6,649,289 B2 | 11/2003 | Hsu et al. |
| 6,653,749 B2 | 11/2003 | Delbridge |
| 6,900,556 B2 | 5/2005 | Provanzana et al. |
| 7,199,550 B2 | 4/2007 | Tsutsui et al. |
| 2004/0197649 A1 | 10/2004 | Clarke et al. |
| 2006/0180364 A1 | 8/2006 | Wobben |
| 2008/0022683 A1* | 1/2008 | Ohler et al. ................... 60/641.8 |
| 2009/0115190 A1 | 5/2009 | Devine |

FOREIGN PATENT DOCUMENTS

WO       2007089872 A2    8/2007

* cited by examiner

*Primary Examiner* — Rexford Barnie
*Assistant Examiner* — Dru Parries
(74) *Attorney, Agent, or Firm* — Vidas, Arrett & Steinkraus, P.A.

(57) ABSTRACT

A method of delivering electrical energy to a point in an electrical power grid, including accessing a source of energy at a first location and converting the energy into a form of transportable energy. The next step is transporting the transportable energy via a bulk transportation network from the first location to the point on said electrical power grid at a second location having a need for additional electrical power without the transportable energy going through the electrical power grid to get to the point. The next step is converting the form of transportable energy into electrical energy suitable for connecting to the power grid and discharging the electrical energy into the power grid at the second location. A system for delivering electrical energy is also provided. The transportable energy preferably takes the form of charged electrolytes, compressed air or thermal storage units, transported, for example, by way of trains.

15 Claims, 13 Drawing Sheets

| Type | Charging | Discharging | Discharging | Discharging | Notes |
|---|---|---|---|---|---|
| Location (as per Figure 8) | 300 | 310 | 320 | 330 | |
| Time of Observation | Bulk Electricity Market: hour ahead contract time | Prices ($/MWh) | | | |
| 5:45a.m. 6:00a.m. | $ 53.00 | $ 57.00 | $ 56.60 | $ 57.90 | Start charging at 6am; Plan to discharge at location 320 on network; |
| 8:00a.m. 9:00a.m. | $ 55.00 | $ 83.00 | $ 89.70 | $ 91.20 | Finish charging at 8am; Start transportation. Plan changes as discharge location 330 is now highest; In transit discharge location 310 becomes optimal; |
| 8:15a.m. 10:00a.m. | $ 55.10 | $ 95.80 | $ 89.20 | $ 90.05 | book contract to start discharging at 10am at 310. |

Fig. 8b

METHOD AND SYSTEM FOR DISTRIBUTING ENERGY

CROSS-REFERENCE TO RELATED APPLICATIONS

This application is a Continuation of Utility application Ser. No. 12/274,878, filed on Nov. 20, 2008, which claims priority to Canadian Application 2,611,424, filed on Nov. 21, 2007, the entire contents which is incorporated herein by reference.

STATEMENT REGARDING FEDERALLY SPONSORED RESEARCH

Not applicable.

FIELD OF THE INVENTION

This invention relates generally to the field of energy distribution and more particularly to the field of distribution of electrical energy in an energy distribution network or power grid.

BACKGROUND OF THE INVENTION

Electricity is currently distributed through a wholesale electrical transmission network or power grid. Typically, the network is operated at a higher voltage than the standard voltage for retail consumption. Electricity may be generated at various locations on the grid by various types of power sources, including nuclear generators, coal-fired and gas driven generators, and hydro electric generators, from where it flows across the grid to centres of demand which include retail distribution operations of for example, local utilities that transmit the electricity onto retail customers, utility operations that distribute electricity to industrial or large commercial customers, or to such large industrial or large commercial customers directly. The form of electrical power that is transmitted over the long distance portions of the grid is alternating current (AC) at high voltage and it is stepped down to progressively lower voltages as it approaches a portion of the grid where it is to be consumed by the end user. An alternative form of current is high voltage direct current (HVDC) which must be inverted back to AC before distribution to the end user. The electricity is directed over a series of electrical wires, supported by power pylons and hydro poles and is often collectively referred to as the power grid. Significant line losses are a feature of such systems.

The development of the grid is often organic in nature. When power supply, power demand and transmission capacity grow at different rates in different locations the potential arises for an excess of supply or demand with an insufficient transmission capacity to move the electricity from one location to another. Changing population demographics and industry locations exacerbate this problem over the long term. Local grid expansion due to local utility planning, and regional grid control, in the form of regional independent system operators also contributes to a lack of a coordinated overall design. The change in the location of consumption and in the location of power generation can result in congestion in the grid at certain points, which can prevent a load centre from receiving enough power. Typically, in North America, this congestion is regional since the wholesale grid is comprised of a relatively small number of large transmission lines. Thus a bottleneck at one location results in supply issues for much of the area on the demand side of the bottleneck (i.e. a big city) that is unable to readily access power from another main transmission line being too remote therefrom. One means currently used for resolving congestion is to allow the market to place a price on the power traversing in the congested region on the grid. During periods of greater demand, a higher price can be obtained for the sale of the power through that bottleneck. The higher price can provide the signal for a degree of demand curtailment.

Electrical demand fluctuates during the day with peaks most often occurring from 8:00 to 10:00 AM and from 5:00 to 8:00 PM. On the other hand, certain types of low cost power generation are more efficient when operated on a continuous basis and other more expensive forms of power generation can be operated in response to peaks and demand. The low cost types of power generation have historically been less attractive to locate sites near population centres (which are typically also demand centres) due to transportation costs associated with the fuel used to generate the electricity, concerns about pollution, and fear of locating nuclear plants near population centres. In the absence of congestion at specific bottlenecks, prices near to low cost generation and a distant load centre are similar but with congestion, and a local excess of demand over supply, price differences can expand significantly. As a result, electricity prices are both time dependent and location dependent in the current power grid. Construction of additional transmission capacity is often not an easy, cost effective or adequate solution to reducing congestion because of the uncertainties of future demand. If new routes are required, then it can be very difficult and expensive to secure the necessary land rights to establish an easement to run the power lines.

Different sections of the grid may be operated by different entities called Independent System Operators. This exacerbates the problems of maintaining an overall grid design as the grid tends to be designed in a piecemeal fashion. The grid operators use several means to control the quantity, quality and stability of the power being transmitted so that the supply is reliable for the customer. The quantity of power transmitted is managed by a system of scheduling and coordinating power transactions between suppliers and consumers which includes managing congestion and/or providing a marketplace whereby rights to traverse a congested part of the grid are exchanged. The quality of power is also in part managed by having generators provide reserves of generation that can be called into service at short notice. The quality of power, in particular the frequency of AC current on the grid, is managed by having suppliers provide spinning reserves that can be called upon instantaneously to help adjust the frequency of the power on the grid or to replace off frequency power supplies. Finally, grid operators also manage the voltage of the AC current on the grid through the provision of voltage support by suppliers to the electrical grid.

Included among these power management strategies are for example, the known technique of peak shaving. In peak shaving, adjacent to a congested location, electricity may be drawn off the grid and locally stored during a low demand period, and then released from that location during a high demand period. Excess demand which is unable to be met due to the congestion at the transmission bottleneck can be met with a boost of locally stored power. While providing an interim or temporary solution, this approach of time shifting does not adequately address the full dynamic nature of the need to match demand to supply through the congested infrastructure of the power grid. As demand grows, the problem of congestion becomes ever more of a concern, a constraint on efficient distribution of electrical power, and inevitably a higher cost to the end user.

As well, as newer renewable resources of energy are tapped, they may be located in sites which are remote from conventional power grids. Indeed, for wind farms and the like, being remote is often preferred.

Efforts exist in the prior art to resolve power grid issues. For example, U.S. Pat. No. 5,610,802 describes an energy storage system which is in a housing having a number of doors and internal racks. Battery modules are placed on the racks and the storage system has an energy storage capacity of 100 kw, and a footprint of less than 400 square feet. This patent describes how the energy storage system is transportable and can be deployed to specific locations to deliver a power boost to a system that is stressed, for example, by extreme cold weather.

However, referring to column 15, line 55 this patent teaches that the batteries be removed and transported separately from the housing during transportation, to reduce the shipping weight of the storage system. It is also contemplated that the batteries be shipped dry, and that the electrolytes be shipped later. So, this patent teaches moving the housing, moving the battery cases separately from the housing and then moving the electrolytes separately from the rest. In other words the invention can be moved from place to place, but is intended to be charged from and discharged at the same location. As such it cannot deal with bottlenecks in the electrical grid.

U.S. Pat. No. 6,026,349 is interesting because it teaches ways to convert and store energy other than through electricity (i.e. compressed gas). However, in this invention teaches locating the storage/discharge facility at the margins of two adjacent power grids, so the energy can be removed from or added to either adjacent grid. The purpose of this invention is to permit specific power conditioning, suitable for either one or the other grid to be performed, to permit the stored power to be released to the power matched grid. However this stationary storage plant cannot be used to for example overcome local bottlenecks in either of the adjacent power distribution grids.

U.S. Pat. No. 6,900,556 is also interesting in teaching the use of capacitors to temporarily store electrical energy. In this patent they teach using a large-scale, capacitor-based electrical energy storage and distribution system capable of effectuating load-leveling during periods of peak demand on a utility, and of effectuating a cost savings associated with the purchase of electrical energy. In a stationary or fixed plant location (for a matter of days or weeks) embodiment a capacitor or multitude of capacitors may be charged with electrical energy produced by the utility, such as during periods of low demand or low cost, and discharged during periods of high electrical energy consumption or high electrical energy cost. One or more capacitors may be located at a consumer's residence or business. Alternatively, a farm of capacitors may be provided at or near a utility, or at or near a location experiencing high demand.

In another embodiment, one or more capacitors may be located in or on a vehicle, such as an automobile, a truck, or a train of a light rail system.

In this embodiment the patent teaches using the stored energy on the vehicle, to drive the vehicle from place to place, for example to permit a light rail line which does not need a power transmission line along its length, therefore reducing the capital cost of the transportation system, (see column 11, lines 5 to 8). In some cases the electrical energy can be applied to a load in the source, but applying the energy to a load does not overcome bottle necks in electrical distribution networks, by making more electricity available on the other side of a bottleneck, which would require power conditioning means to make the electrical energy suitable for adding to the grid at that point. Furthermore, by consuming electrical energy to drive the vehicle, there will be little left over to provide at the load.

Other prior art patents of general interest in power storage and energy distribution include U.S. Pat. Nos. 3,682,704; 5,439,757; 5,798,633; 6,475,661; 6,649,289; 6,653,749; 7,199,550; and U.S. Publication No. 2004/0197649.

What is desired is a form of resolving problems of getting electricity from a location where it can be generated at a low cost, and delivering the electricity beyond the congestion bottlenecks or infrastructure gaps to where it can be sold for a high price. What is required is a way of providing such electricity which is dynamic and can be adapted for changes in the demand location over time without requiring expensive capital improvements to the existing grid, without requiring new expensive right of ways, and without exposing people to more incident electro-magnetic fields associated with high tension electrical wires.

SUMMARY OF THE INVENTION

Accordingly, the present invention is directed to a method of distributing electrical energy to a point in an electrical grid without the electricity going through the electrical power grid to get to the point. The present invention also comprehends a distribution system for achieving such power distribution.

Therefore according to a first aspect the present invention provides a method of delivering electrical energy to a point in an electrical power grid, said method comprising the steps of:

accessing a source of energy at a first location;

converting said energy into a form of transportable energy;

preserving and transporting said transportable energy from said first location having said source of energy to said point on said electrical power grid at a second location having a need for additional electrical power without said transportable energy going through said electrical power grid to said point;

converting said form of transportable energy into electrical energy suitable for said electrical power grid at said point and discharging said electrical energy into said power grid at said point.

According to a further aspect the present invention provides a method of distributing electrical energy to a point in an electrical grid without said electricity going through said electrical grid to said point, as stated above wherein said step of converting said energy into a form of transportable energy comprises changing an electrochemical potential of both a positive and a negative liquid electrolyte at a charging station connected to said source of electrical energy;

said step of transporting said transportable energy comprises transporting said liquid electrolytes from said first location to said second location and said step of converting said form of transportable electrical energy comprises placing said liquid electrolytes in a discharging station at said point in said electrical grid at said second location; and discharging electricity to said point through said discharging station.

According to a further aspect the present invention provides a distribution system for distributing electricity around, but not through, a power grid said distribution system comprising:

a first compressor connected to a source of power at a first location to store energy by compressing air into a compressed air storage container; and a means for preserving and transporting said stored energy in said compressed air storage container to and from said first location compressor;

a second means for converting compressed air into electrical energy, said second means being connected to said electrical power grid at a second location for receiving said compressed air from said; compressed air storage container wherein said second means conditions said electrical energy to be compatible with said power grid at said second location and distribution system permits electrical power to be added to a point in the power grid without being transmitted through said grid to said point.

According to a further aspect the present invention provides a distribution system for distributing electricity around, but not through, an electrical power grid, said distribution system comprising:

a charging station connected to a source of power at a first location to convert electrical energy into a form of transportable energy;

a means for transporting said transportable energy from said first location to a second location;

a discharging station at said second location connected to said electrical power grid to convert said transportable energy back into electrical energy; and an electrical connection between said electrical power grid and said discharging station to permit said electrical energy to be discharged into said electrical power grid at said second location.

BRIEF DESCRIPTION OF THE DRAWINGS

Reference will now be made, by way of example only, to preferred embodiments of the invention, in which:

FIG. 8*b* is a pricing table for wholesale electrical energy for different times and places in the transportation network of FIG. 8*a;*

DETAILED DESCRIPTION OF THE PREFERRED EMBODIMENTS

Figure 1:
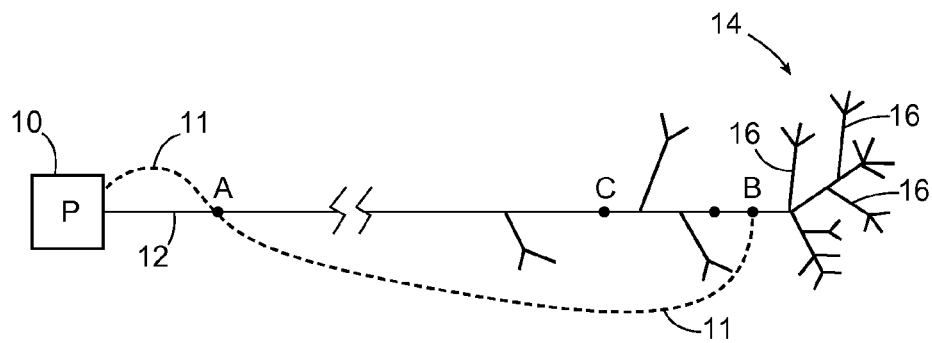
FIG. 1 is a schematic of a power grid.

FIG. 1 shows a schematic of a portion of a power grid system. At the left hand side a source of power 10, which might be any conventional source of power such as a coal or gas fired power plant, nuclear plant, wind farm, hydro electric dam of the like. Adjacent to the source of power 10 and located on the power line 12 is a grid point A. The power line 12 extends typically a significant distance across a series of power grid sections (not shown) eventually, the power line 12 ends up adjacent to a high load or heavy demand district 14. This is illustrated by a plurality of branches 16 which extend from the power line 12 within the area 14. Also shown is a second grid point B adjacent to the high demand area 14. Also shown is a dashed line 11, which is explained in more detail below.

Electricity produced at the source of power 10 passes through grid point A on the power line 12. Eventually the power reaches grid point B adjacent to the demand area 14 still on the power line 12. As can be appreciated, the demand for electricity at point B adjacent to the demand area 14 will be significant. In the event that the demand in area 14 grows in size beyond that which can be easily transmitted to point B, for example by reason of a capacity limit or constraint on the power line 12 at point C, there may be a shortage of supply of electricity which can pass through point C to meet the demand in area 14 past point B. In this circumstance, the price of power will rise and a certain rationing of power consumption will occur in the area 14 by reason of the higher price.

In contrast, at power grid point A, there is little local demand meaning that the power being transported along the line 12 is generally always sufficient to meet the small amount of change of local demand. Thus, the price fluctuations for power over a 24 hour period at point A are much less than those experienced at point B because power demand is not in excess of the power carrying capacity of the grid at that point.

Figure 2:
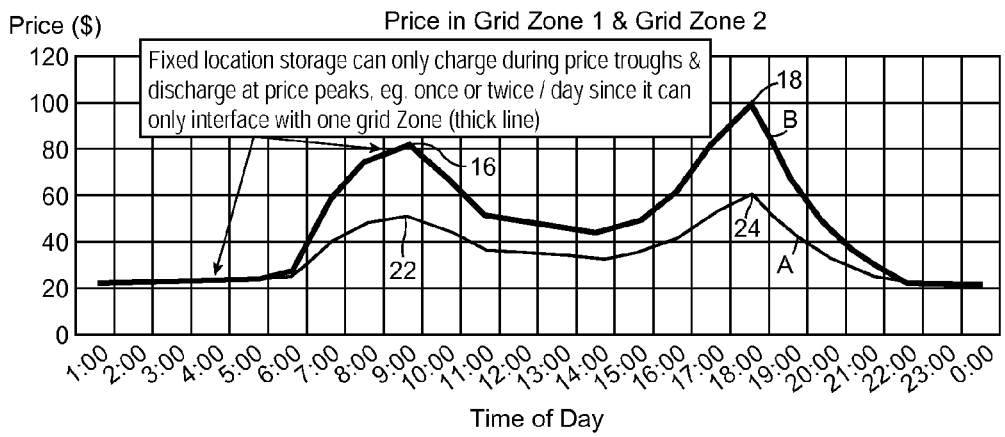
FIG. 2 is a price vs. time plot for two points, A and B in the power grid of FIG. 1.

FIG. 2 shows a graph in which the price of the electricity charged to customers at point B, past the line capacity constraint at point C, is shown with Line B and the price to customers at point A is shown at Line A over a typical 24 hour period. The absolute values will of course fluctuate over time, from year to year and the like. What is relevant to this invention is the cost pattern, rather than the specific cost amounts. As can be seen from the power price curve, two price peaks occur in the cost of the electrical power, one in the morning between approximately 6:30 AM and 11:30 AM and a second one occurs beginning at approximately 2:30 PM and the costs rise until a peak is reached at around 6:30 PM. Then, power cost declines over time until it reaches a minimum around 10:30 PM. This pattern is true for both grid points A and B. It will now be understood that even though the grid point A is located somewhat closer or adjacent to the source of power 10, there will still be a price change with time during each day with peaks 22 and 24 which are generally at or about the same time as the peaks 16 and 18 for the power at grid point B. There is a difference however in terms of the relative cost with the prices at grid point B being significantly higher due to the larger local demand and the bottleneck effect at point C of the transmission capacity limits of power line 12.

Figure 3:
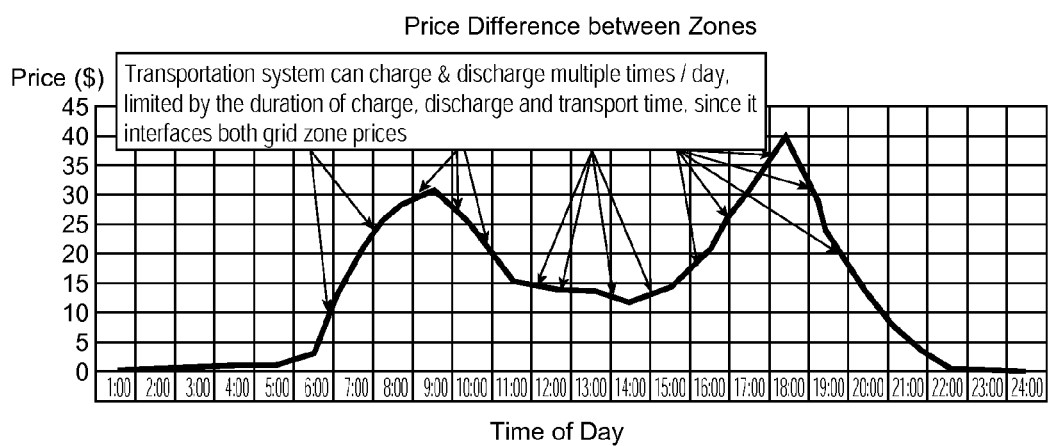
FIG. 3 is a plot of the price difference between the points A and B of FIG. 2.

FIG. 3 plots the price difference between the power costs versus time graphs of FIG. 2. As can be seen, the relative costs vary significantly between grid point A and grid point B over the typical 24 hour cycle. It will be understood by those skilled in the art that the power cost curves shown are illustrative in nature, and are not intended to reflect the exact amounts of any specific location. However, the trends shown by the graphs are believed to be generally representative of what occurs.

An aspect of the present invention is to take advantage of the price differential between grid point A and grid point B at different points of the daily price cycle. The present invention in one embodiment involves the delivery of electrical energy, for example to grid point B, from electrical energy extracted from at or about grid point A which electrical energy is not delivered by means of power line 12. Thus, the present invention comprehends delivering electrical power from grid point A to grid point B without transmitting the power along the power grid or electrical power line 12. The advantage of the present invention is therefore to avoid the transmission bottleneck of the power grid located before point B at point C. Thus, in addition to the time shifting of power delivery of the peak shaving method of the prior art the present invention adds location shifting.

As shown in FIG. 1, the dashed line 11 illustrates the alternate route for the energy according to the present invention. In some cases, the source of power 10 does not generate electricity so the dashed line 11 represents getting the power from the power plant to the point A. From there the energy, in the form of a transportable energy that can be readily converted into electrical energy, is transported along route 11, to point B.

According to the present invention, there are a number of most preferred ways of so delivering power along route 11. While these two most preferred ways are discussed in detail below, it will be understood by those skilled in the art that other ways of implementing the present invention are also comprehended. In the first preferred embodiment of the present invention, a charging device is used to change the electro-chemical potential of a positive and negative electrolyte solution at the location of grid point A. In other words, abundant and relatively low-cost power is used to change the electro-chemical potential of the electrolytes in a manner analogous to a flow battery.

Figure 4:
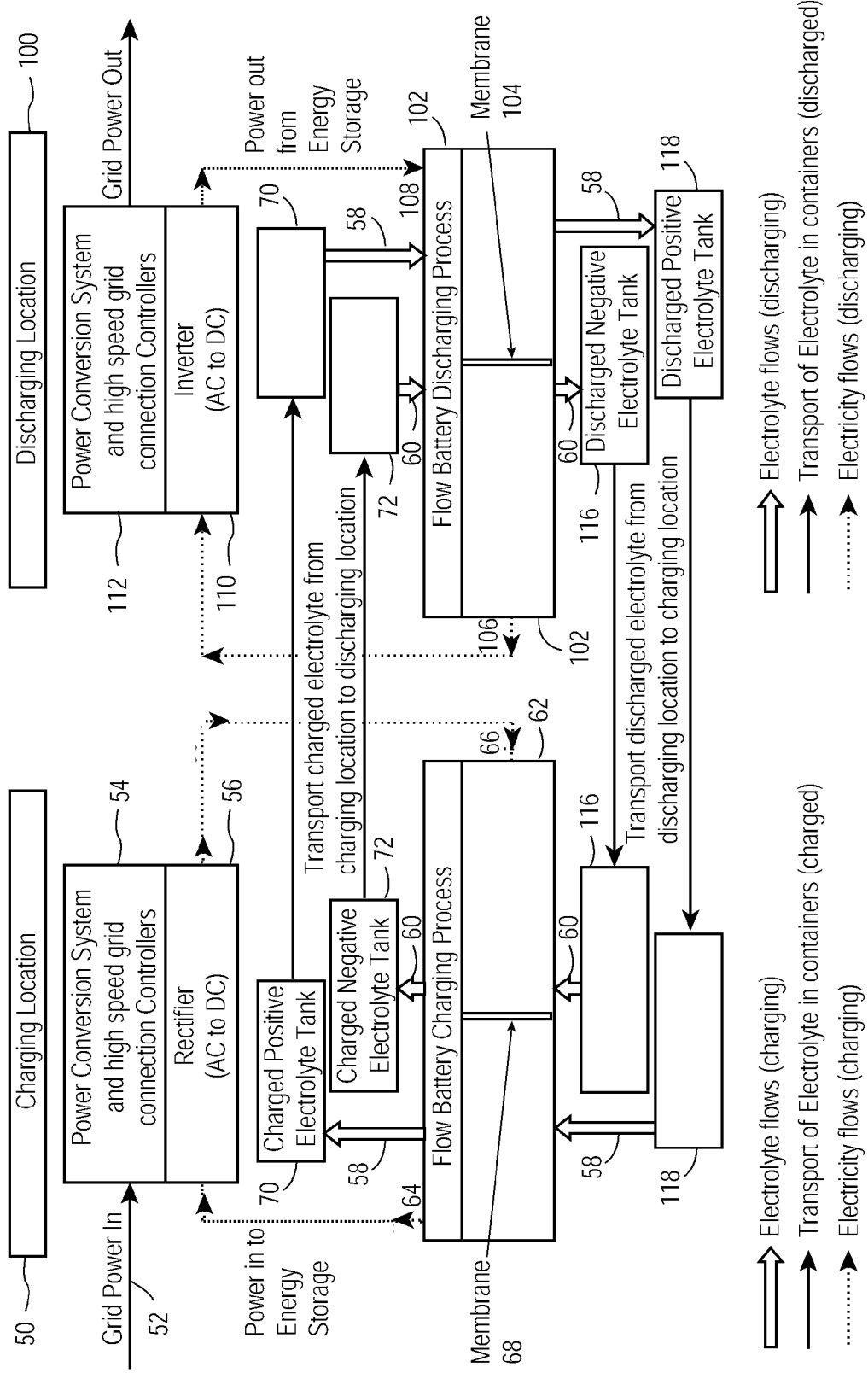
FIG. 4 is a schematic of a charging and a discharge arrangement according to one embodiment of the present invention.

FIG. 4 shows the elements of a charging station 50 according to the present invention. According to the present invention, a specific and cost effective type of electrolyte charging and discharging arrangement can be used to transport electrical energy from point A to point B in the grid without necessarily going through the grid points namely, along route 11. More specifically, an electrolyte charging station illustrated at 50 in FIG. 4 can be provided at grid point A, where the cost of power is low. In addition to being a lower cost source of power, charging can be time modulated to ensure that the lowest price of power at grid point A is used. The electrolyte charging station 50 consists of a source of grid power 52 which feeds into a power conversion system and high speed grid connection controller 54. A rectifier 56 is provided to convert the power from AC to DC.

Like a flow battery, the charging station 50 of the present invention differs from a conventional battery in that the chemical reaction occurs between two electrolytes rather than between an electrolyte and an electrode, and the electrolytes are stored external to the electrode section and are only circulated through the electro-chemical cell stack as required to store electrical energy. As in a flow battery the charging station 50 uses an electrode that does not take part in the electrochemical reactions, but merely serves as a substrate or a conductor.

The positive 58 and negative 60 electrolyte are circulated through the cell stack 62 where the DC current is applied across the electrodes 64, 66 (not shown) to create an electrochemical potential between the two electrolytes. Ions pass across the membrane 68 to change the electrochemical potential of the electrolytes. Banks of cells may be linked together to create a bipolar module cell stack where the electrodes are shared between adjacent cells with the cathode of the first cell becoming the anode of the next cell and so on. Linked in series, sufficient cells in the stack can then form the desired voltage for the cell stack. During operation, the circulation control system causes the electrolytes to flow from two separate storage tanks through the cell stacks. A negatively charged electrolyte 60 and a positively charged electrolyte 58 are used on opposite sides of the membrane. The electrolytes flow to the cell stack where ions are transferred between the two electrolytes across the ion exchange membrane 68. After the reaction, the electrolytes are returned to separate storage tanks 70, 72. Most preferable these electrolytes are placed into transportable storage containers 70, 72, for example, railway tankers, for transportation to a second location, such as point B. The amount of electricity transported, is directly related to the volume of electrolyte that is being transported and the energy density of the electrolyte used.

As will be understood by those skilled in the art, there are a number of specific chemistries for the electrolytes, including, vanadium redux, zinc bromine, polysulphide bromine, and cerium/zinc. One advantage of an electrolyte charging system as described is that the electrical storage capacity is related only to the liquid storage capacity of the electrolyte storage reservoirs. The present invention takes advantage of the external storage aspect of the electrolyte.

Located beyond the transmission bottleneck, at point C, is point B, which has an electrolyte discharging apparatus 100, which is the geographically remote second part of a first embodiment of the present invention. It also has a cell stack 102, which may be characterized as a discharging cell stack 102 (the right side of FIG. 4). Most preferably the charging and discharging locations are each located adjacent to a convenient transportation corridor, such as a railway line, so that a train, for example, can be used to haul the liquid electrolytes between point A and point B, even though point A and B are geographically remote from one another. At point B, the electrolytes 58, 60 can be passed through the discharging cell stack 102 by a circulation control system so as to pass ions across the membrane 104 and cause an electrical potential to arise between the electrodes 106, 108 (not shown). An inverter 110 (DC to AC) inverts the electrical power, and through a power conversion system 112 and high speed electrical grid connection controller the electrical energy is dumped back into the grid. It will be appreciated that after the electrolytes 58, 60 are circulated past the membrane 104, they can be reloaded into the transportable containers 116, 118 for delivery back to grid point A for recharging. The electricity is therefore provided or made available beyond the transmission bottleneck C. This electricity can be sold at a higher rate at point B than it was purchased for at point A and can be used to alleviate supply issues arising beyond the bottleneck at C. As can now be understood the time of discharge can be controlled to optimize revenue, and the type of discharge can be controlled to achieve power conditioning ends such as voltage support, frequency control and/or spinning reserves.

The present invention comprehends that the facilities to extract electricity at point A, then to add electricity at point B, be made with as little cost as possible. Therefore, rather than building a complete flow battery at each location A and B, the present invention comprehends building an electrolyte charging station 50 at the low cost power site A, and an electrolyte discharging station 100 at the higher priced location B. Thus, while each location would require a circulation control system for the liquid electrolytes 58, 60 and a cell stack, there would be no need for each location to have both a power inverter and a rectifier, which would always be found in a flow battery. According to the present invention, only charging or discharging is needed at each location. This reduces the cost of the installations at each location and the capital cost of implementing the present invention.

It can now be appreciated that this embodiment of the present invention provides a system for transporting electricity from an oversupply location A to an excess demand location B without transmitting the electricity across the transmission constrained electrical grid through an infrastructure bottleneck C. It will also be appreciated that the electrical power delivered can be used for other purposes, such as power conditioning and the like as may be required to keep the grid in stable operational condition.

Figure 5:
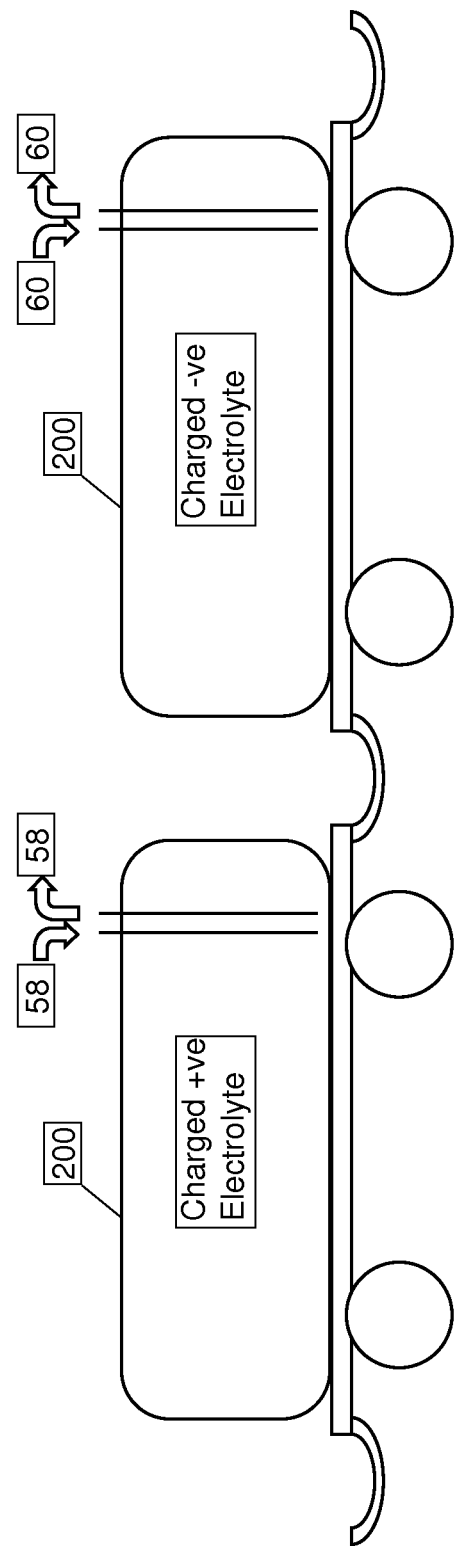
FIG. 5 is a transportable container according to one aspect of the present invention.

FIG. 5 shows a schematic of transportable storage containers 70, 72, 116, 188, which in this case are shown as railway cars 200, transporting the charged and discharged positive and negative liquid electrolytes 58, 60. Although they are depicted as railway cars 200, the present invention comprehends that other forms of freight transportation could also be used, such as barges, ships or the like.

According to a second embodiment of the present invention, the energy can also be stored by means of a compressed gas storage system. In this embodiment, the energy is converted, by such means as a compressor or otherwise, into a compressed gas, and again stored in a pressure vessel form of transportable storage container such as a railway car shown as 210 in FIG. 6. The railway car 210 can be transported along a transportation route, within a transportation network such as a railway line, to location B, where the energy can be reconverted to electrical energy by releasing the pressure of the gas through a generator. Various techniques are available to ensure that the energy stored is reliably recovered, including, using a heat sink to improve the energy conversion from the gas to electrical energy. An example of such a conversion is as follows.

Compressed air energy storage ("CAES") carries out said conversion by sending stored compressed air, mixed with a fuel source for heat generation, into a combustion chamber. The hot, expanding exhaust gases drive turbine blades in a turbine connected to the output shaft of the device that in turn drives the input shaft of an alternator.

Thermal and compressed air storage ("TACAS") carries out said conversion by sending stored compressed air through a pre-heated thermal storage unit and, in its simplest form, into an expansion turbine that drives the input shaft of an alternator. Use of TACAS technology accommodates that the sources of energy be used to be in the form of transportable energy, e.g., stored heat and stored compressed air. The present invention comprehends various configurations, such as simple or more complex turbine configurations in which the heating of the air is provided by an external heat source, or a combination of external heat source and stored thermal energy.

CAES and TACAS require a short period of time, typically between one and five minutes to reach full output. Therefore in order to make the CAES and TACAS conversion of stored energy to electricity applicable to power grid ancillary services such as voltage support, frequency control and spinning reserves these configurations may include a flywheel or an supercapacitor either transported with the transportable energy or located at the discharge station to permit instantaneous response to grid requirements.

As with the previous embodiment the preferred form of the transportable energy is one that is as energy dense as possible to make the transportation costs as low as possible. Thus the present invention comprehends configuring the transportable storage containers in a manner that maximizes the efficient transportation of the energy.

A "transportation network" according to the present invention means a set of transportation paths, with discrete starting and ending locations, along which transportation occurs within that network. The restrictions of a limited set of paths and nodes are offset by higher efficiency of bulk transportation and the ability to use existing infrastructure. A preferred transportation network according to the present invention is a railway network. Such a network can be used to minimize unit transportation costs and yet operate on a large enough size to benefit the power grid with network effects, as well as price dampening and grid stabilization. "Freight transportation" refers to the preservation and bulk transportation of transportable stored energy according to the present invention on a large enough scale for the electrical energy to be suitable for conditioned connection to the wholesale power grid at, for example, a substation.

Figure 6:
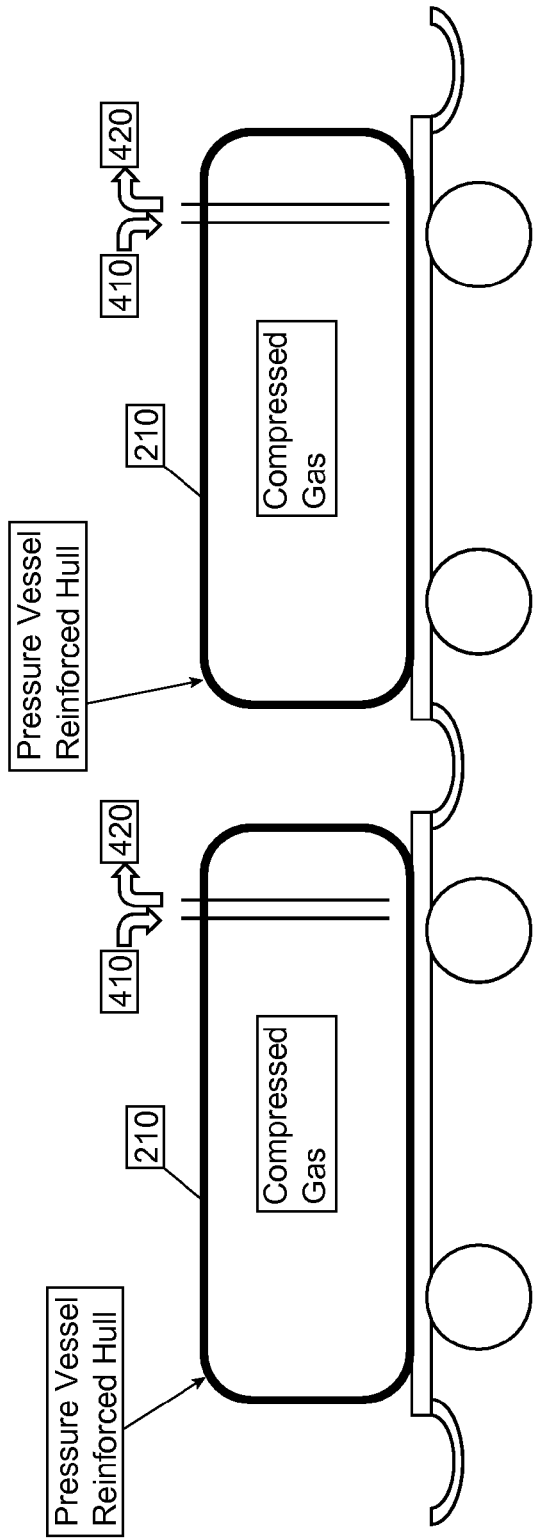
FIG. 6 is a transportable container according to a second aspect of the present invention.

FIG. 6 shows an alternate embodiment of the transportable container, at 210, which is in the form of a reinforced pressure vessel, to carry compressed gas as explained below. Again, while a railway car is shown, other forms of transportation vehicles are also comprehended for moving the pressure vessel from point to point such as barges or the like.

Figure 7:
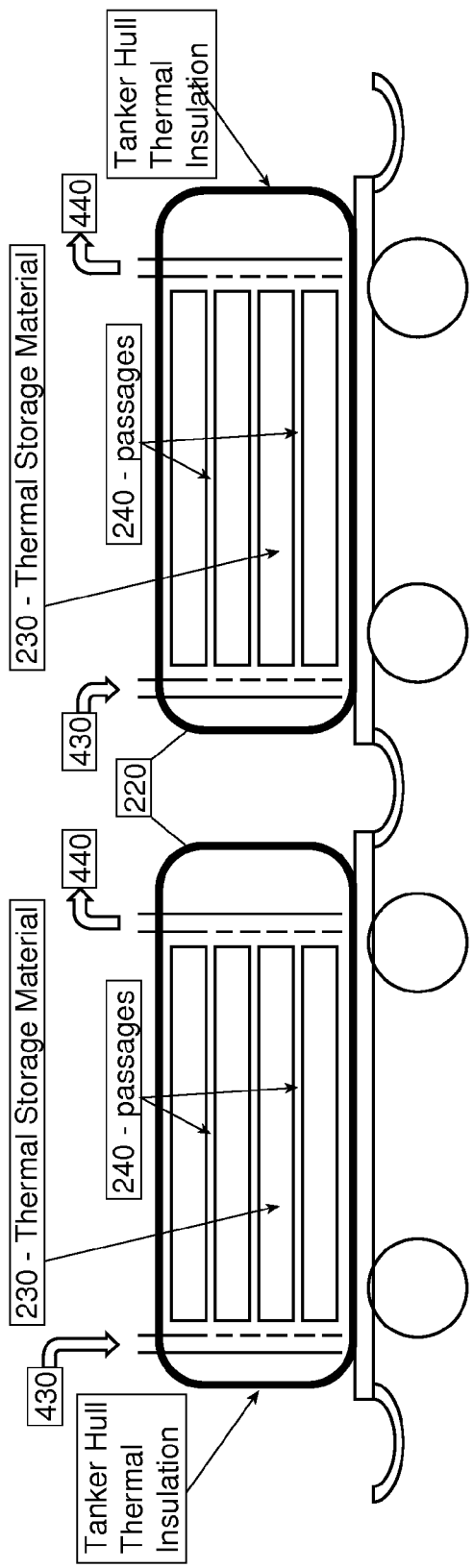
FIG. 7 is a transportable container according to a further aspect of the present invention.

FIG. 7 shows a further embodiment of the transportable container, in which a heat sink or thermal storage material 230 is provided in the thermally insulated vessel 220 to retain, upon heating, thermal energy, for increasing the efficiency of the conversion of the pressurized gas into electricity or for the direct operation of an engine or engine system that uses heat as energy source for generating electricity. Passages 240 through the thermal storage material are also shown for heat transfer. Again, any suitable freight transportation can be used, although railway cars are likely preferred as the low cost transportation method.

As can now be understood, in this embodiment, the same principles apply, namely, that the energy can be acquired at a low cost location, converted to a transportable form of energy, and then transported to any given location for re-conversion back into electrical energy and for re-sale at that point. The present invention comprehends that there may be a plurality of discharge locations serviced by one or more charging locations. The delivery of electrical energy can be coordinated to maximize economic value of the electricity at the location adjacent to the load which may be sold as raw power, used as reserve power or used for power conditioning purposes and the like.

Figure 8A:
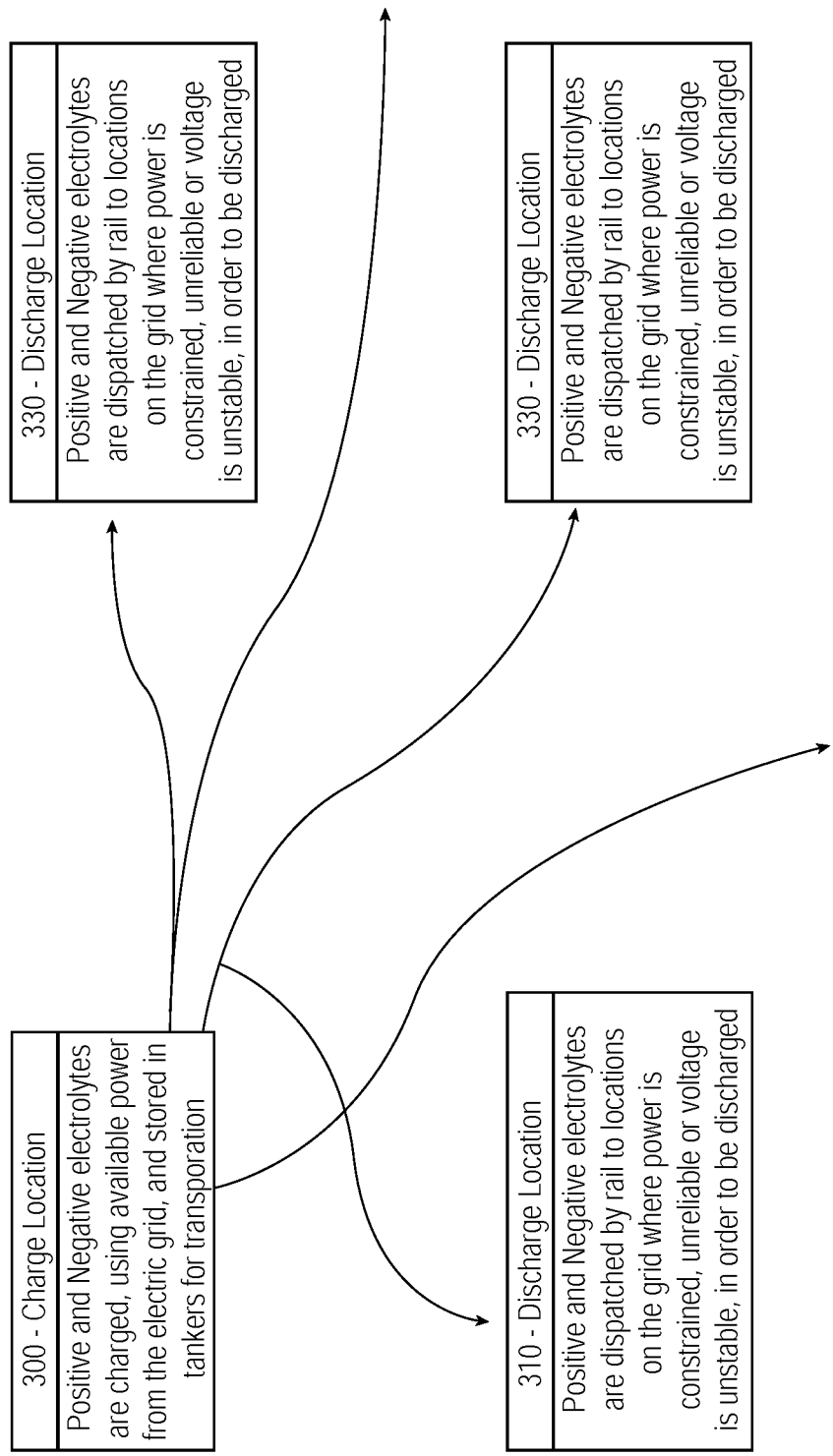
FIG. 8*a* is a view of a network arrangement according to the present invention.

FIG. 8a shows how the capability of the present invention may be used to relieve multiple transmission bottlenecks or to provide spot delivery of the electrical power to any point where it might be usefully used. For example, a single charging location 300, can be used to supply transportable energy to a plurality of discharging locations 310, 320, or 333, depending upon the local demands, transmission bottlenecks and power grid requirements. The charging location 300 can be located within one independent system operator's grid, and the discharging location can be located within a second independent operator's grid. In this example the present invention comprehends directing the transportable energy to the location 310, 320 or 330 where the economic value for the electrical energy can be optimized. Thus the present invention comprehends both a method of distributing the transportable energy and a distribution system consisting of at least one charging location adjacent to a low cost source of power, or a renewable source of power, or a low greenhouse gas producing source of power, for creating a transportable form of energy, a transportation network and at least one discharging location located on the demand side of a transmission bottleneck for discharging said energy.

Another aspect of the present invention is shown in FIG. 8b where the most suitable selection of location for discharge may change both during the period of charging and during transport. Initially at 5:45 am, during charging, the discharging location on the transportation network that offered the highest price was location 320, but that was for 6:00 am not the anticipated discharge time of 10:00 am. By the time charging was completed at 8:00 am the price that could be received for the stored energy was highest at discharging location 330. However by 8:15 am and after the transportable energy was already in transit the highest price for the transportable energy at the expected discharge time of 10:00 am was at location 310, so a contract to discharge at that location can be booked.

The network effect of this invention permitted a higher realised energy price of $6.60 per megawatt hour than was initially available, e.g. The seller actually received $95.80 at discharge location 310 rather than the $89.20 at discharge location 320 which was originally expected when starting to charge. The flexibility of the energy transportation system of the present invention also enabled a greater price realisation of $5.75/megawatthour than was anticipated when the transportable energy first began to move, e.g. the $95.80 actually received at location 310 as compared to the price of $90.05 at location 330 which was the highest price when transportation began. This flexibility arises in one embodiment, from having multiple charging stations. As can now be appreciated, the more network nodes, whether charging, discharging or both, the more flexible the supply of conditioned electrical energy from the transportable stored energy becomes. Thus an aspect of the present invention is to monitor the price of electricity in the power grid, and to direct the transportable energy to locations in the grid as dictated by those local prices to optimize financial returns. For best effect the prices should be monitored in real time.

Another aspect of the present invention can now be understood. Referring to FIG. 1, the dashed line 11 is shown between the source of power 10 and the point A. In cases where no electric transmission infrastructure exists, for example, at a remote wind farm, there may be no need to turn the power into electricity first. For example, at a wind farm to convert wind energy into electrical energy entails some losses. To turn the electrical energy into transportable energy will entail further losses. And, upon reconnecting, converting the transportable energy into electrical energy involves further losses. In the case of the pressure storage form of energy of the present invention, the wind energy can be converted directly into transportable energy (pressurized gas) without first being transformed into electrical energy to reduce conversion losses which might otherwise be incurred.

Figure 9:
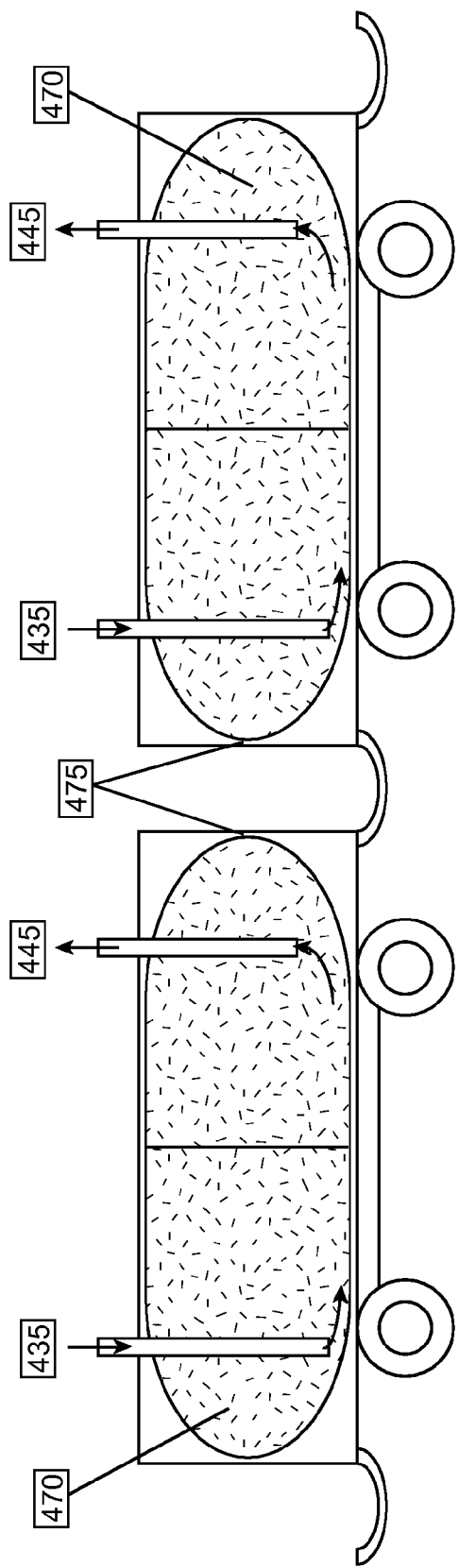
FIG. 9 is a transportable storage container for a thermal storage fluid according to a further aspect of the present invention.

In a further alternative, FIG. 9 of the present invention comprehends storing the heat energy in a fluid storage medium such as hot oil or molten salt. Referring to FIG. 9, a fluid thermal storage medium 470 is placed into the thermally insulated storage vessel 475 via input pipe 435. At the discharge location the fluid thermal storage medium is removed via outlet pipe 445. Again, any suitable freight transportation can be used, although railway cars are likely preferred as a low cost transportation method.

Figure 10:
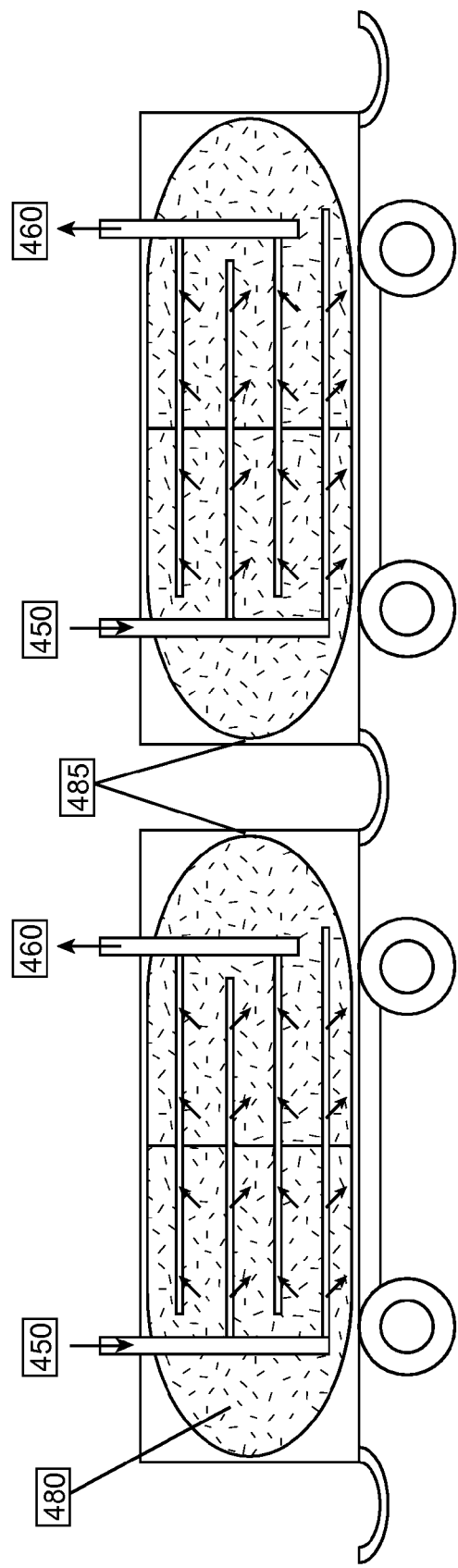
FIG. 10 is a transportable storage container for a phase change thermal storage material according to a further aspect of the present invention.

In a further alternative, FIG. 10 shows various phase change energy storage materials 480 in the form of, one or a combination of, gases, liquids, solids, plasma or otherwise having a high heat capacity within an insulated thermal storage container 485 which would also be suitable according to the present invention. In this embodiment a piping system 450 and 460 would permit the heat to be extracted, typically using a heat transfer fluid, from the storage medium 480 at a discharge location and the heat would be used to run a Sterling heat engine connected to an electric generator for example to generate the electricity.

Figure 11:
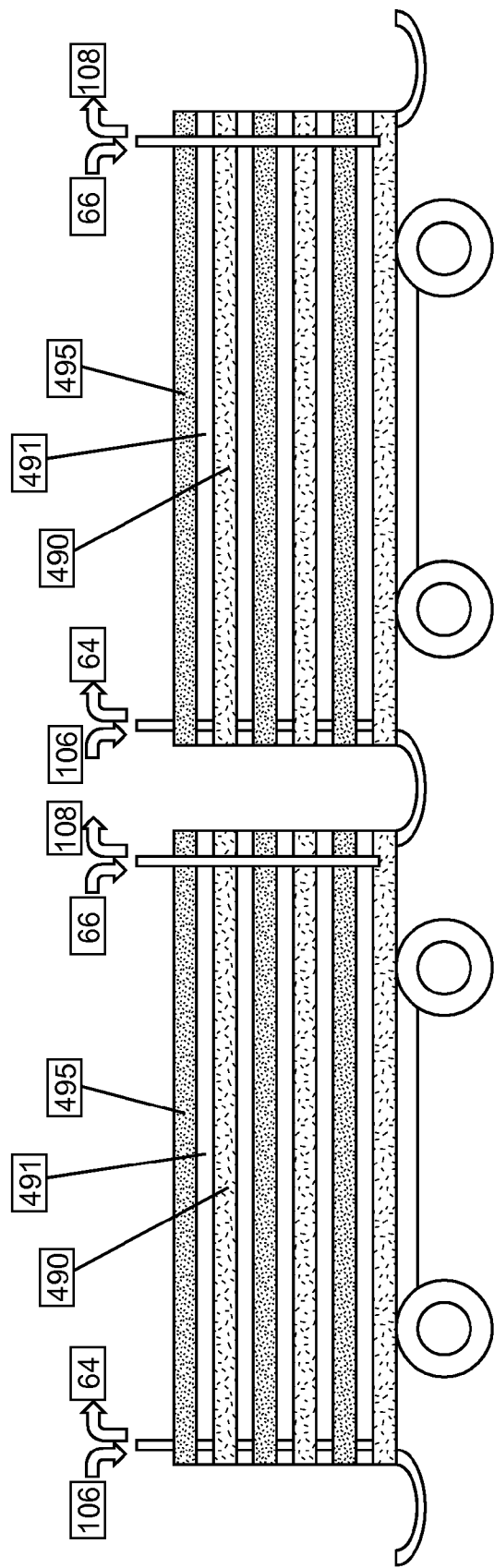
FIG. 11 is a transportable storage container for layers or plates of super capacitor energy storage media according to a further aspect of the present invention.

In a further alternative, FIG. 11 shows a supercapacitor composed of, as an example, layers of alternating positive 490 and negative 495 electrodes kept apart from each other by electrical insulation dielectric materials or by separating layers, 491. At the charging station, direct current voltage is directed into connection 66 and out of connection 64. At the discharging station direct current is discharged out of connection 108 with the returning circuit completing at connection 106. The amount of electricity transported is directly related to the unit size, and thus unit weight, of the supercapacitors that are being transported and their energy density.

As will be understood by those skilled in the art, there are a number of specific configurations and compositions of both electrode plates and any separating layers. One advantage of a supercapacitor charging system as described is that the electrical storage capacity is related primarily to the surface area of the dielectric insulators or separating layers, given any particular supercapacitor technology, and thus to the weight of the supercapacitor. The present invention takes advantage of the massive bulk carrying capacity of means of freight transportation. This further permits advantageous tradeoff of unit weight for energy storage capacity unit cost, such that heavier but lower capital cost supercapacitors can be used that would not be as practical in other ways of using and deploying supercapacitors.

The concept of this invention of using energy transportation media other than the power grid is suitable for relieving power grid bottlenecks as previously explained, but is also particularly useful, for example, for wind or solar energy sources that might be too remote to be even connected to a grid. In such cases the direct heating of a fluid thermal storage medium for example is seen as particularly advantageous, as it eliminates the capital cost of running a fixed electrical line to the remote location (i.e. connecting the solar thermal farm to the power grid) and also eliminates the line losses associated with the transmission of electrical power, which can also reduce the overall gains available from such renewable energy sources.

Various types of transportation of the energy storage media and both fixed routing and flexible routing transportation networks are comprehended by the present invention including barges, moving through a maritime ship transportation network, a canal network, intermodal transportation, from barge to railcar or the like, and further including a barge canal network which is interconnected to a railway network with intermodal transportation capabilities. As can now be better understood an advantage of the present invention is that it utilizes existing bulk transportation infrastructure, which have already been built, to transport power in a novel way. Such power, according to the present invention is supplied to the wholesale power grid, by being converted, conditioned and connected to the wholesale high voltage power grid.

A further alternative of the present invention as shown is to transport both the energy storage media, such as the pressurized gas or the liquid electrolyte, and the energy conversion equipment, such as a turbine generator or an electrolyte conversion system such as a flow battery conversion cell. As will be appreciated by those skilled in the art the cost of transporting the additional components might be offset by the flexibility of discharging location. While the means for conversion of the heat energy to electricity, such as a turbine, might be transported from location to location as well (see FIGS. 12a,

12b, and 12c), the present invention comprehends that means for conversion would be most preferably installed at the discharge location.

Figure 12A:
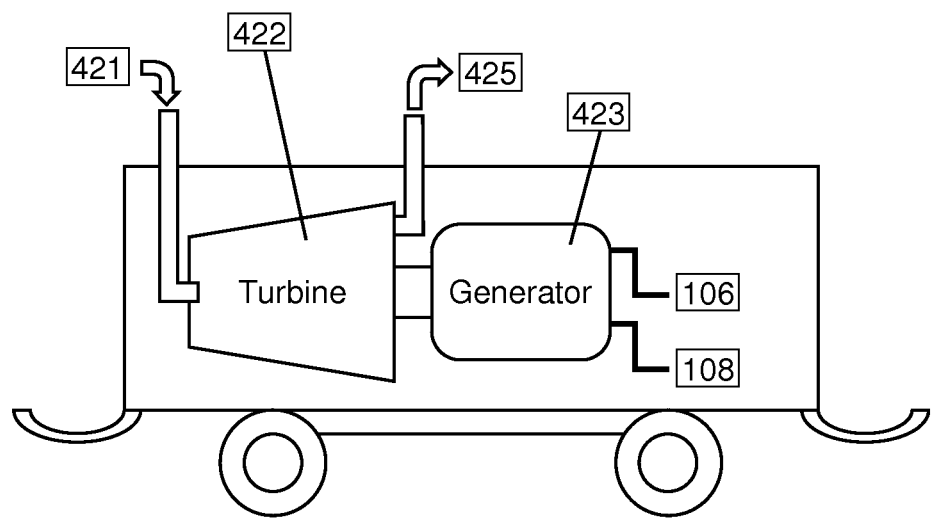
FIG. 12*a* is an example of one format of transportable energy conversion equipment according to the present invention.

In FIG. 12a, one embodiment of this invention as shown is to transport a pressure driven turbine in a container on a railcar along with containers of pressurized gas such that at the discharge location such that gas from outlet pipe 420 in FIG. 6 is connected to inlet piping 421 of the turbine 422 causing the shafts of the turbine and the generator, 423, to rotate thereby producing electricity. The generator is connected to the inverter and power conversion system at the discharging station via electrical connection 106 and 108 in a similar manner to the arrangement in FIG. 4.

Figure 12B:
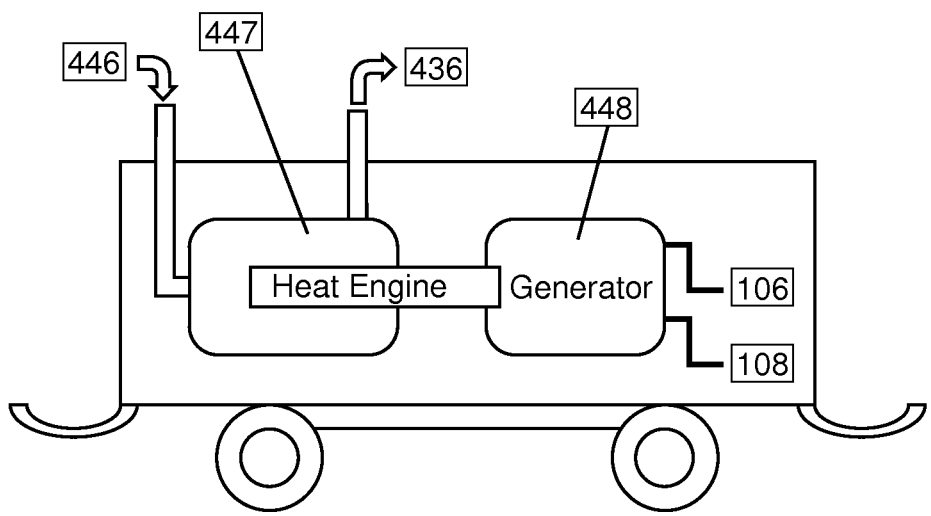
FIG. 12*b* is an example of a second form of transportable energy conversion equipment according to the present invention.

In FIG. 12b, another embodiment of this invention as shown is to transport a heat engine, such as a Sterling engine, in a container on a railcar along with containers of heated fluid thermal storage media such that at the discharge location the fluid, 470, from the thermal storage container [475] outlet pipe 445 in FIG. 9 is connected in FIG. 12b to inlet piping 446 of the heat engine 447 causing the heat engine to operate and the shaft of the generator, 448, to rotate thereby producing electricity. The heated fluid thermal storage media is returned from the engine outlet piping, 436, in FIG. 12b, to the inlet pipe, 435 in FIG. 9, of the thermal storage container 475. The generator, 448 in FIG. 12b, is connected to an inverter and a power conversion system at the discharging station via electrical connections 106 and 108 in a similar manner to the arrangement in FIG. 4.

Figure 12C:
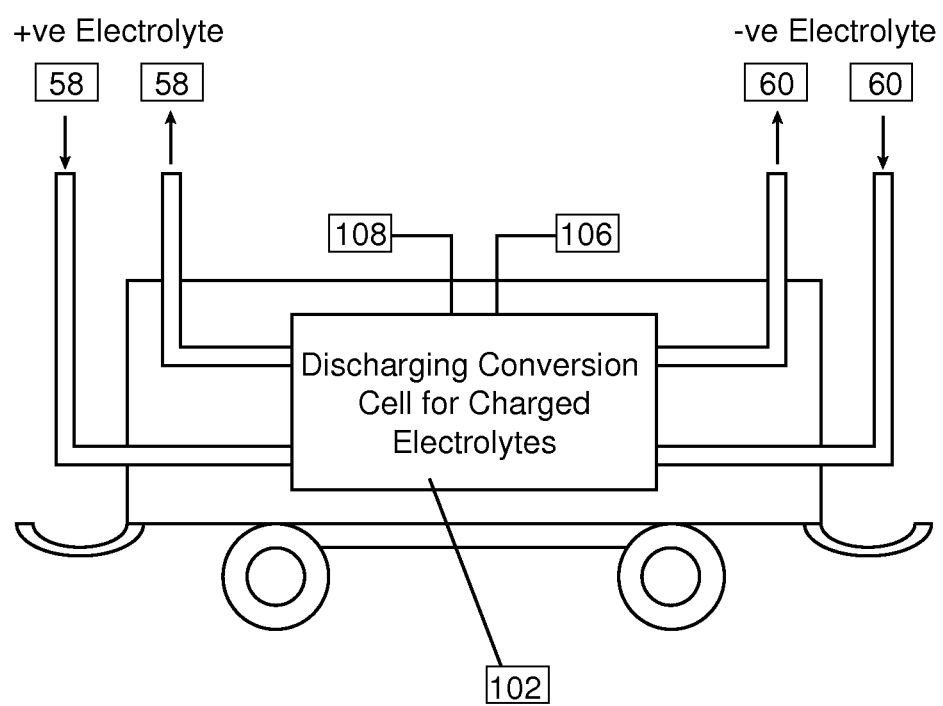
FIG. 12*c* is an example of a third form of transportable energy conversion equipment according to the present invention.

In FIG. 12c, another embodiment of this invention as shown is to transport a Discharging Conversion Cell for Charged Electrolytes, 102, as also shown in more detailed context in FIG. 4, in a container on a railcar along with container, 70 in FIG. 4, of +ve charged electrolytes 58 and container, 72 in FIG. 4, of −ve charged electrolytes 60, such that at the discharge location the charged electrolytes from the transportable containers, 200, in FIG. 5 are passed through the appropriate part of the Discharging Conversion Cell, 102 in FIG. 12c, thereby producing electricity. This transported Discharging Conversion Cell is temporarily connected during discharge to an inverter and a power conversion system at the discharging station via electrical connections 106 and 108, as also shown in FIG. 4.

While various modifications are discussed above, the scope of the invention is only restricted by the limitations of the attached claims. Various alternative embodiments have been described, such as using either liquid electrolytes and flow battery cell stacks to extract and re-inject electricity into selected locations on the power grid, or, by using a compressed gas energy storage system for the same purpose. Other modifications are also comprehended by the attached claims.

What is claimed is:

1. A method of delivering electrical energy to a point in an electrical power grid without said electrical energy going through said electrical power grid to said point, said method comprising the steps of:
    accessing a source of energy at a first location;
    converting energy from said source of energy into compressed air energy, thermal energy, or phase-change energy;
    storing said compressed air energy, thermal energy, or phase change energy in a transportable storage container adapted to substantially preserve said energy;
    transporting said transportable storage container from said first location to said point on said electrical power grid at a second location having a need for additional electrical energy;
    providing an energy conversion means at each said second location;
    converting said compressed air energy, thermal energy, or phase change energy into electrical energy suitable for supply to the electrical power grid using said energy conversion means; and
    discharging said electrical energy into said electrical power grid at said point.

2. The method as claimed in claim 1, wherein said step of converting said energy from said source of energy into said compressed air energy comprises using a compressor to compress and store air into said transportable storage container; said step of transporting said transportable storage container comprises moving said transportable storage container by a transportation means, and said step of converting said compressed air energy comprises using the energy released upon decompression and expansion of said compressed air to create electricity at said point at said second location.

3. The method as claimed in claim 1, wherein said step of converting said energy from said source of energy into said thermal energy comprises using a heater to heat said transportable storage container; said step of transporting said transportable storage container comprises moving said transportable storage container by a transportation means, and said step of converting said thermal energy comprises using said stored thermal energy to create electricity at said point at said second location.

4. The method as claimed in claim 1, wherein said step of converting said energy into phase-change energy comprises using a heater to change a phase of an energy storage material to store energy in a phase-changed material which is then held in said transportable storage container in said phase-changed state, said step of transporting said transportable storage container comprises moving said transportable storage container by a transportation means, and said step of converting said phase-change energy comprises rechanging the phase of the energy storage material to release the energy stored to create electricity at said point at said second location.

5. The method as claimed in claim 1, wherein said method includes the further step of returning said transportable storage container to said first location for recharging.

6. The method as claimed in claim 1, wherein said transportation step includes transporting said compressed air energy, said thermal energy, or said phase-change energy by one or more of railway, barge, and ship.

7. The method as claimed in claim 1, wherein said electrical energy discharged at said second location into said electrical power grid is for one or more of power conditioning, voltage support, frequency control, spinning reserves, and bulk power sales.

8. The method as claimed in claim 1, wherein said first location is located in a transmission grid controlled by a first Independent System Operator and said second location is located in a transmission grid controlled by a second Independent System Operator.

9. The method as claimed in claim 1, wherein there is a plurality of discharging second locations, and said transportation step includes transporting said compressed air energy, said thermal energy, or said phase-change energy to one of said discharging second locations.

10. The method as claimed in claim 1, further including a plurality of charging first locations and a plurality of discharging second locations wherein said method further includes the step of routing said compressed air energy, said thermal energy, or said phase-change energy between said plurality of charging first locations and said plurality of discharging second locations.

11. The method as claimed in claim 1, wherein said source of energy at said first location is one or more renewable sources of energy selected from the group consisting of solar power, wind power, hydro power, wave power, and geothermal power.

12. A system for delivering electrical energy to a point in an electrical power grid without said electrical energy going through said electrical power grid to said point, said delivery system comprising:
    a charging station connected to a source of energy at a first location to convert energy from said source of energy into compressed air energy, thermal energy, or phase-change energy;
    a transportable storage container for transporting said compressed air energy, thermal energy, or phase-change energy from said first location to said point on said electrical power grid at a second location having a need for additional electrical energy, said transportable storage container being adapted to substantially preserve said energy;
    a discharging station at said second location, each said discharging station having an energy conversion means connected to said electrical power grid to convert said compressed air energy, thermal energy, or phase-change energy back into electrical energy; and
    an electrical connection between said electrical power grid and said energy conversion means to permit said electrical energy to be discharged into said electrical power grid at said point.

13. The system as claimed in claim 12,
    wherein said charging station is configured to convert said energy into said compressed air energy by means of a compressor to compress air into said transportable storage container; and
    wherein said discharging station comprises a means for receiving said compressed air from said transportable storage container and converting energy stored in said compressed air into electrical energy suitable for connecting to said electrical power grid wherein said electrical energy can be discharged into said electrical power grid through said electrical connection.

14. The system as claimed in claim 12,
    wherein said charging station is configured to convert said energy into said thermal energy by means of a thermal generator to store thermal energy in said transportable storage container; and
    wherein said discharging station comprises a means for receiving said thermal energy from said transportable storage container and converting said thermal energy into electrical energy suitable for connecting to said electrical power grid through said electrical connection.

15. The system as claimed in claim 12,
    wherein said charging station is configured to convert said energy into said phase-change energy by means of changing the phase of a phase-change energy storage material to an energy retention phase which is then stored in said transportable storage container; and
    wherein said discharging station comprises a means for receiving said phase-change stored energy from said transportable storage container and converting said phase-change stored energy into electrical energy suitable for connecting to said electrical power grid through said electrical connection.

* * * * *